Sept. 1, 1931.         J. BUCHLI         1,821,612
COMPOSITE CRANK AXLE FOR VEHICLES TRAVELING ON RAILS
Filed June 19, 1929
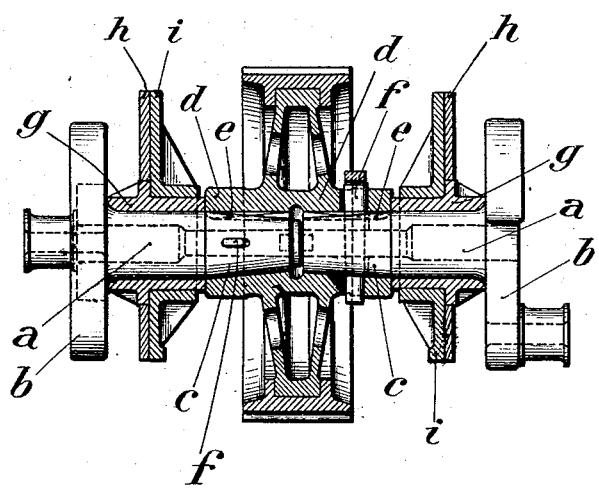
Inventor:
Jacob Buchli,
By Harry Ortly
        Atty Patented Sept. 1, 1931

1,821,612

UNITED STATES PATENT OFFICE

JACOB BUCHLI, OF WINTERTHUR, SWITZERLAND

COMPOSITE CRANK AXLE FOR VEHICLES TRAVELING ON RAILS

Application filed June 19, 1929, Serial No. 372,119, and in Germany June 23, 1928.

It is known, to make crank axles for steam locomotives, having interior cylinders, of several parts, such as shaft stubs, crank arms and crank pins. The thus built up crank axles which are ordinarily made in nine pieces, have been manufactured in England under the name of the Webb system and their usefulness is due to the fact that they are composed of simple parts which are relatively light in weight and which can be assembled by means of a press, whilst the crank axles made in one are much more difficult to forge and to press respectively as well as to machine and if a piece happens to be defective the whole of it must be thrown on the scrap heap.

Every crank axle, having exteriorly disposed crank arms, requires openings for the axle boxes in the frame plates which are open at the lower part of the frame and which afterwards must be closed by braces. These openings weaken the frame a great deal and, consequently, it is necessary, especially with sheet metal frames, to employ heavy horn blocks and horn stays in order to partly replace the lost solidity of the frame. Further, the height of the frame plates must be made as large as possible on account of these openings, however, in many cases this height is limited.

According to the present invention the frame is not to be slotted at the points for accommodating the axle bearings, but each frame plate is provided with a hole in which the axle box made in one, is inserted.

Thus, the weakening of the frame by the openings for the axle boxes is reduced to a minimum and frame plates of less height and, therefore, of less weight are required.

In order to insert the axle into the axle-box it is necessary to make the axle in several parts i. e. to use two shaft stubs, which, on the one end, are provided with a crank arm, and, on the other end, with a taper, and further a gear wheel the hub of which is provided with conical bores and which serves as a coupling sleeve for the two shaft stubs.

Keys arranged on the shaft stubs prevent the same from turning in the sleeve and besides, each shaft stub is traversed by a transverse wedge passing through the sleeve for securing the stubs in their relative positions.

The wedges arranged on the tapering shaft stubs prevent the latter from turning in the conical bores, whilst the transverse wedges, in the first place, are intended to avoid a separation of the shaft stubs in the axial direction but, in the second place, they also serve to prevent rotation.

In the accompanying drawing an embodiment of the invention is schematically illustrated, by way of example, Each of the shaft stubs $a$ carries, on its one end, the crank arm $b$ and, on its other end, is provided with the taper $c$. The tapering ends $c$ engage in corresponding bores in the hub $d$ of a gear wheel, in which they are held and secured by the keys $e$ arranged on the shafts as well as by the transverse keys $f$. The axle $b$ is mounted in the locomotive plate frame $h$ by means of the flanged axle boxes $g$ and the locomotive plate frame may be reinforced at this point by means of a stiffening member $i$ having a hole smaller than the hole in the frame in which the flange of the axle box seats, so that the stiffening member forms a seat for the body of the axle box.

I claim:

1. In a vehicle traveling on rails, a frame having two frame plates, said plates being provided with circular holes, axle boxes fitted in said holes of said frame plates, a composite crank axle comprising two shaft stubs mounted in said bearing, a crank arm on the outer side of each shaft stub made in one with the latter, a gear wheel arranged intermediate of said axle boxes and having a hub, and means for rigidly securing the inner ends of said shaft stubs in said hub and connecting said shaft stubs to each other as to form a unitary structure.

2. The combination with a locomotive frame having substantially parallel side members, said members being provided with alined circular holes between the upper and lower surfaces thereof and axle boxes in said holes; of a gear wheel between said side members, a stub shaft in each box having a driving crank at one end outside of the frame and with its end secured in the hub, said stub shafts being inserted through said boxes into the hub.

3. The combination with a locomotive frame having parallel side members, each side member having a circular hole therein between its upper and lower surfaces, the hole in one member alined with the hole in the opposite member, and a stiffening member surrounding each hole; of an axle box in each hole, a gear wheel between the side members, and stub axles having a driving crank on one end inserted through each box and secured in the hub of the wheel.

4. The combination with a locomotive frame having parallel side members, each member having a circular perforation between the upper and lower surfaces and the holes alined, an axle box having a flange fitting the hole and a stiffening member on the inside of each side member and having a hole fitting the body of the box; of a gear wheel between the side members, stub axles having a crank on one end outside of the frame and whose opopsite ends are secured in the hub of the gear wheel, each axle box being held between a crank and a stiffening member.

In testimony whereof I have signed my name to this specification.

JACOB BUCHLI.